United States Patent [19]

Sergay

[11] 4,144,948
[45] Mar. 20, 1979

[54] POWER STEERING SYSTEM

[76] Inventor: Dimitry B. Sergay, 427 Dorothy Dr., King of Prussia, Pa. 19406

[21] Appl. No.: 904,990

[22] Filed: May 11, 1978

[51] Int. Cl.² .............................................. B62D 5/06
[52] U.S. Cl. .................................. 180/148; 74/388 PS
[58] Field of Search ............... 180/148, 154, 155, 156, 180/157, 158, 159, 160; 74/388 PS; 280/68; 92/68

[56] References Cited

U.S. PATENT DOCUMENTS

| | | | |
|---|---|---|---|
| 3,347,109 | 10/1967 | Adams | 74/388 PS |
| 3,814,202 | 6/1974 | Rushton | 180/148 |
| 3,897,845 | 8/1975 | Loivs | 180/148 |

Primary Examiner—Joseph F. Peters, Jr.
Assistant Examiner—R. Schrecengost
Attorney, Agent, or Firm—Morton J. Rosenberg

[57] ABSTRACT

An improved power steering system for displacing a tie rod connected to a wheel of a vehicle for rotational actuation of the vehicle wheel. Rotational actuation of a steering wheel of the vehicle correspondingly rotatively displaces a pinion gear mounted within a rack housing. The pinion gear matingly engages rack teeth of a rack member which is slidingly mounted within the rack housing. Relative displacement between the rack housing and vehicle frame actuates a hydraulic valve secured to the frame of the vehicle. Actuation of the hydraulic valve permits fluid under pressure to egress from the hydraulic valve through one of two outlet ports. The high pressure fluid is inserted into a power cylinder which drives a cylinder rod in a longitudinal direction. The cylinder rod is secured to a stabilizer tube mechanism which has a fork member secured to a movable element of the stabilizer tube and extending in a transverse direction to the longitudinal direction. The fork member is secured to an inner ball joint socket on the end of the rack for reversibly displacing the rack and two tie rods in the longitudinal direction.

16 Claims, 5 Drawing Figures

POWER STEERING SYSTEM

BACKGROUND OF THE INVENTION

1. Field of the Invention

This invention relates to power steering systems utilized in vehicles. In particular, this invention pertains to improved power steering systems using a rack and pinion interface responsive to rotation of a steering wheel of the vehicle. Still further, this invention relates to an improved power steering system utilizing relative displacements of a rack housing relative to a vehicle frame for actuation of a hydraulic valve member for inputting fluid under pressure to a power cylinder. More in particular, this invention pertains to an improved power steering system utilizing a displaceable stabilizer tube for imparting a longitudinal force to a rack of the vehicle while minimizing any bending moments applied to the rack.

2. Prior Art

Power steering systems for vehicles are known in the art. Additionally, some prior systems utilize rack and pinion type actuation. However, in some such prior art, the rack member actuates the tie rod in a longitudinal direction directly. In some prior art systems, elastic rubber isolators are generally not utilized for automatically returning a rack housing to a centering position. Thus, complex hardware is necessary for return of such rack housings.

Additionally, in some prior art systems, the rack housings are not clamped to the hydraulic valve system in a manner such that movement of the rack housing causes actuation of the valve system. Such prior art systems include complex hardware linkage mechanisms for actuation of the hydraulic valve cylinders.

Further, in some prior art systems, bending moments are applied to the rack which actuates the wheel rotation. Such prior art systems cause undue force loading in unwanted directional positions and tend to decrease the usable life of the power system.

SUMMARY OF THE INVENTION

A power steering system for linearly displacing a tie rod for rotationally activating at least one wheel of a vehicle. The power steering system includes a rack member which extends in a longitudinal direction and is coupled to the tie rod. A rack housing is displaceable in the longitudinal direction responsive to engagement of the rack member and the rack housing. Elastic displacement elements are coupled to the rack housing and a frame of the vehicle for returning the rack housing to a predetermined position subsequent to the rack housing displacement. A power drive mechanism is coupled to the rack housing and is actuatable responsive to the rack housing displacement. A displacement mechanism is secured to the power drive mechanism and the tie rod for responsive movement of the tie rod on actuation of the power drive mechanism.

BRIEF DESCRIPTION OF THE DRAWINGS

FIG. 4 is a sectional view of the displacement mechanism of the power steering system taken along the section line 4—4 of FIG. 1; and, FIG. 5 is a cut-away elevational view of the hydraulic valve of the power steering system.

DESCRIPTION OF THE PREFERRED EMBODIMENTS

Figure 1:
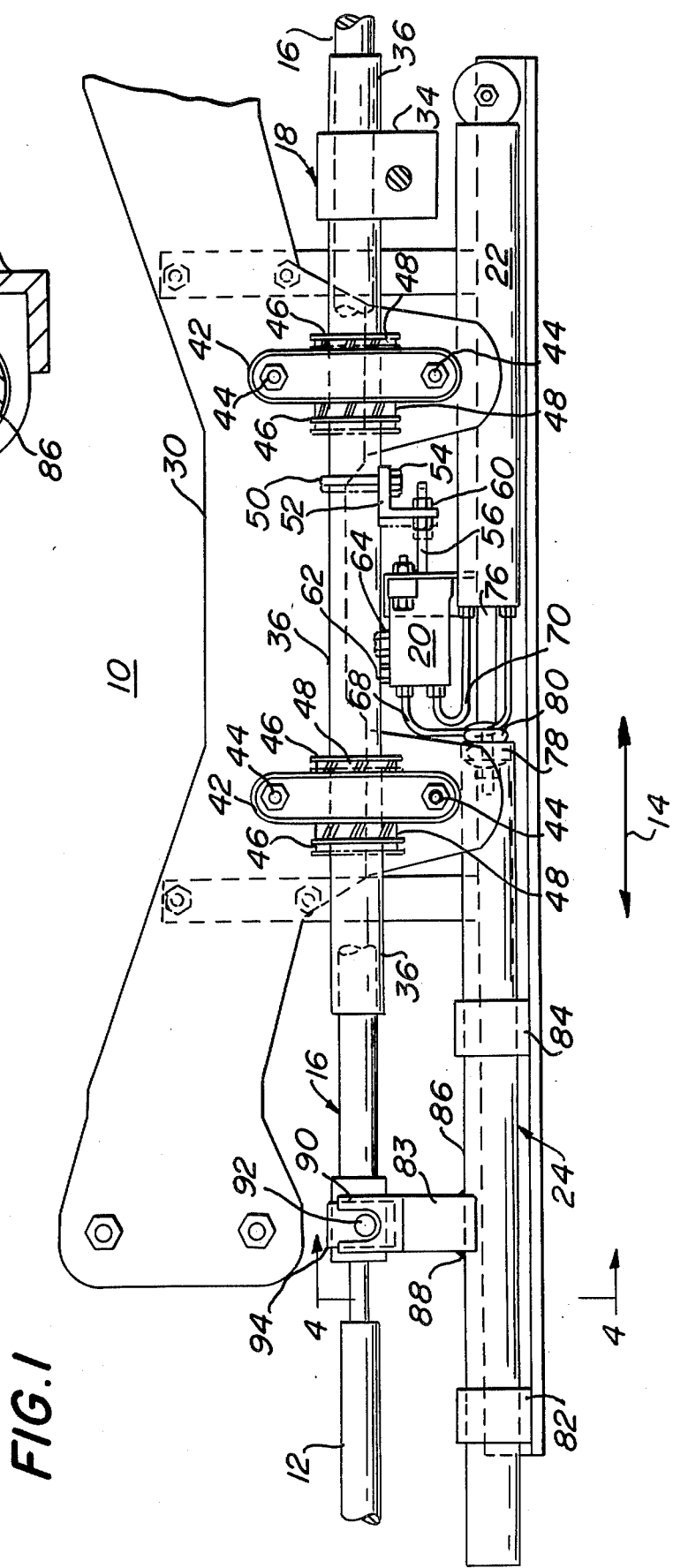
FIG. 1 is a plan view of the power steering system being partially cut away.

Referring now to FIGS. 1-4 there is shown power steering system 10 for linearly displacing tie rod 12 in reversible longitudinal direction 14. Displacement of tie rod 12 in longitudinal direction 14 has the resultant effect of rotating the axis of a wheel of a vehicle in a manner well-known in the art. The linkages between tie rod 12 and the wheel of a vehicle are standard kinematic linkage connections well-known in the art and not part of the instant inventive concept. In overall concept, power steering system 10 is provided in order to sense driver input force level and translate such into relative displacement between rack housing 18 and vehicle frame 30. Due to the elastic restraints 48 between rack housing 18 and frame member 30, relative displacement is in longitudinal direction 14 which has a resulting effect of actuating hydraulic valve 20 to provide input to power cylinder 22. Power cylinder 22 responsively moves displacement mechanism 24 in longitudinal direction 14. Displacement mechanism 24 is secured to one end of tie rod 12 and provides responsive displacement of tie rod 12 in longitudinal direction 14. Two important considerations of power steering system 10 are to provide displacement actuation by sensing input force levels from the rotation of a steering wheel through relative displacement of rack housing 18 and frame member 30. Additionally, another important objective and consideration of power steering system 10 is to provide a longitudinally directed force displacement mode of operation on rack 16 without applying bending moments or other forces to rack 16 which would not be coincident with longitudinal direction 14.

Figure 2:
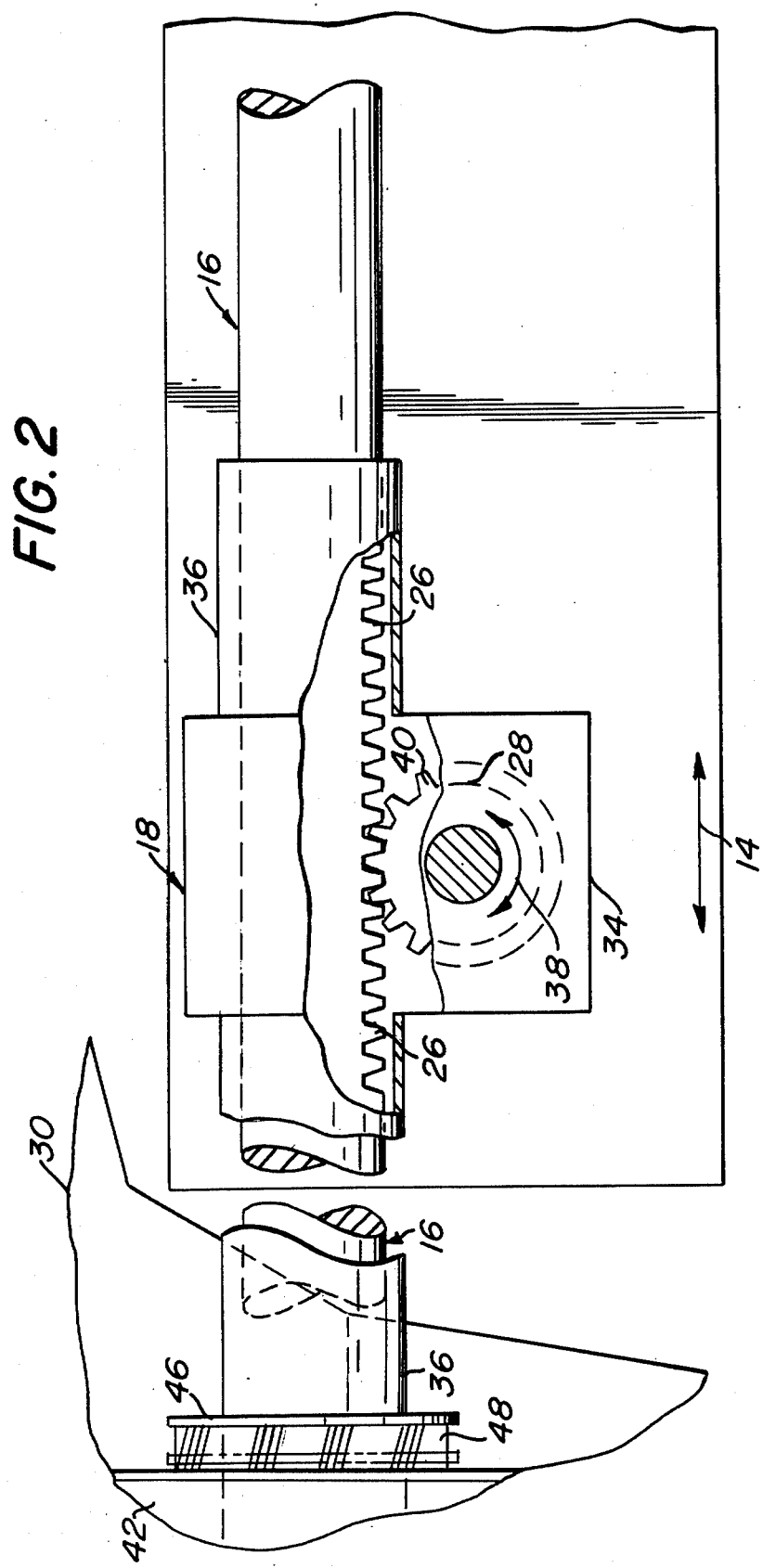
FIG. 2 is an elevational cut-away section of the rack member and rack housing of the power steering system.
Figure 3:
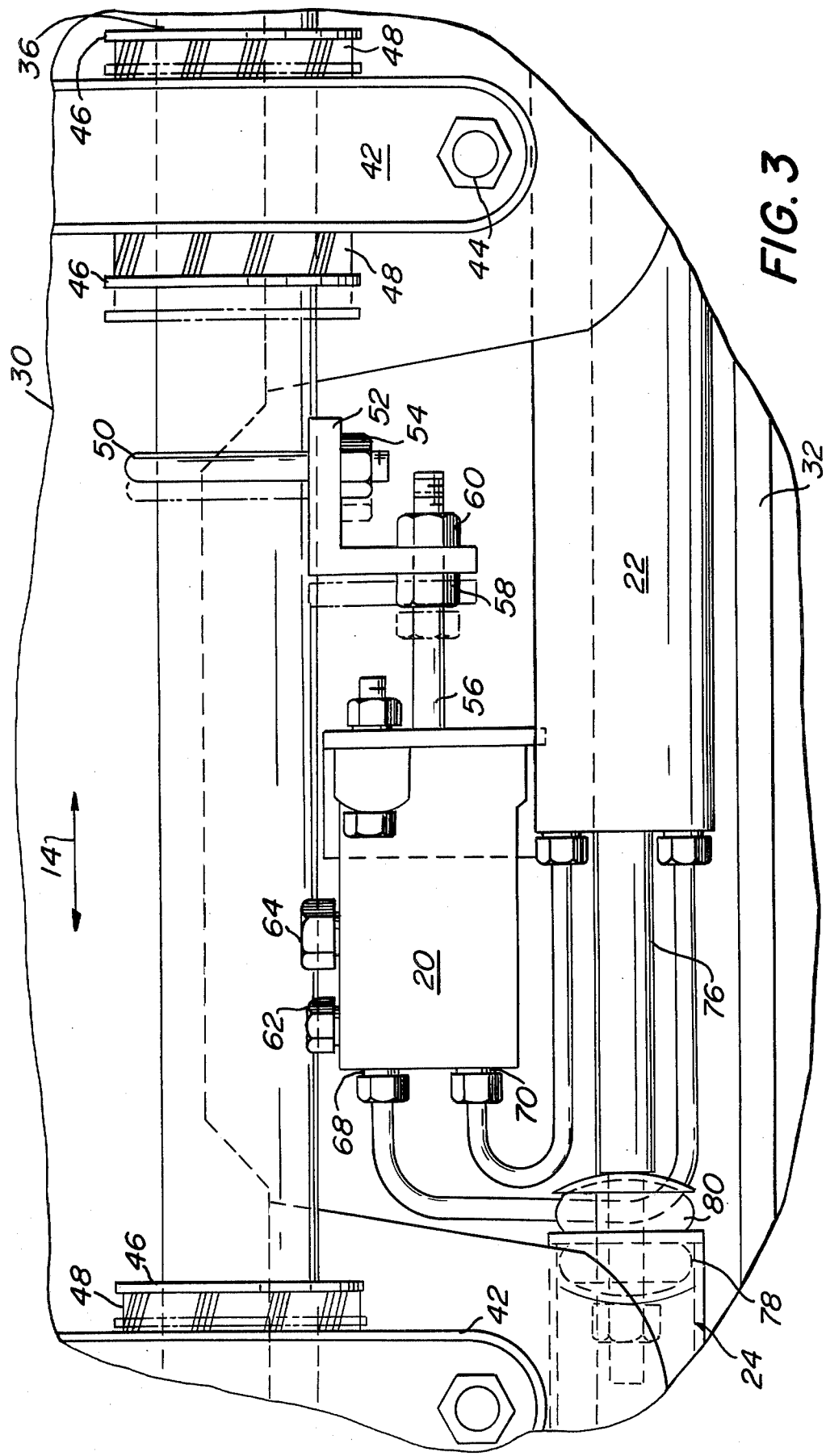
FIG. 3 is an enlarged elevational view of the power drive mechanism of the power steering system.

Referring now to FIGS. 1-3, it is seen that rack member 16 extends in longitudinal direction 14 and is coupled in secured fashion to one end of tie rod 12. Rack member 16 further includes one portion clearly seen in FIG. 2 to contain rack teeth 26 for mating engagement with rack housing pinion gear 28. Rack member 16 is displaceable in longitudinal direction 14 with respect to fixed frame member 30, rack housing 18, and chassis section 32. Rack member 16 is generally cylindrical in cross-sectional contour analogous to an extended cylindrical rod member.

Rack housing 18 includes rack housing box 34 formed in one piece construction with rack housing tubular member 36. Rack housing 18 is displaceable in longitudinal direction 14 responsive to engagement of rack housing pinion gear 28 with rack teeth 26 formed on rack member 16 as will be discussed in following paragraphs. Rack member 16 is slidingly displaceable within both rack housing tubular member 36 and rack housing box section 34.

Rack housing pinion gear 28 is rotationally mounted within rack housing box section 34 and is rotationally driven as depicted by rotational directional arrow 38. Housing pinion gear 28 is kinematically coupled to the steering wheel and steering drive shaft and is responsively rotated in conjunction with driver rotational input. The linkage connections between pinion gear 28 mounted within rack housing box 34 are standard in the art and not part of the inventive concept as is herein described. When the operator rotationally activates the steering wheel of the vehicle, housing pinion gear 28 is responsively rotated and due to mating engagement between pinion gear teeth 40 and rack teeth 26 there is formed a force reaction which attempts to displace rack 16 in one direction which is opposed by rack housing 18 in the opposite longitudinal direction 14.

Frame clamps 42 are mounted and secured to frame member 30 on opposing transverse sides of both rack member 16 and rack housing 18 as is clearly seen in FIG. 1. Frame clamps 42 are secured to frame member 30 through threaded bolts 44 or some like mechanism not important to the inventive concept as is herein described. The important consideration being that both rack member 16 and rack housing 18 are captured within frame clamps 42 and are only displaceable in longitudinal direction 14.

Tubular member flange elements 46 are fastened or formed in one piece formation with rack housing tubular member 36. Flange elements 46 are generally annular in contour and provide a rigid element whereby rubber isolation or elastic displacement members 48 may be mounted between flanges 46 and frame clamps 42. Prior to a discussion of the displacement of rack member 16 and rack housing 18, it is to be understood that frame clamps 42 are grounded or maintained in a non-displaceable securement to frame member 30. In contradistinction, both rack member 16 and rack housing 18 are relatively displaceable with respect to both frame 30 as well as power steering frame section 32.

Rubber isolators or elastic displacement elements 48 are annular rings provided for the centering of rack housing 18 subsequent to some operator input. Thus, when rack housing 18 is displaced in longitudinal direction 14, it is seen that rubber isolator members 48 are compressed on one side of frame clamps 42 and provide an opposing force to ultimately return rack housing 18 to a centered position.

It has now been shown that rotational movement of rack housing pinion gear 28 has a resulting displacement of tubular member 36 and housing box 34 in longitudinal direction 14. Valve clamp 50 is rigidly secured to rack housing tubular member 36. Valve clamp 50 may be U-shaped and frictionally secured or otherwise rigidly mounted to an outer peripheral wall of rack housing tubular member 36. Clamp 50 is secured to L-bracket member 52 through threaded nuts 54 or some like element constraint mechanism. As shown in FIG. 3, L-bracket member 52 is mounted to valve rod 56 by rod bolts 58 and 60. Thus, displacement of housing tubular member 36 in longitudinal direction 14 has a resulting drive displacement of valve clamp 50. Movement of valve clamp 50 causes a similar displacement of L-bracket member 52 which is captured between rod nuts 58 and 60 and causes movement of valve rod 56.

Figure 5:
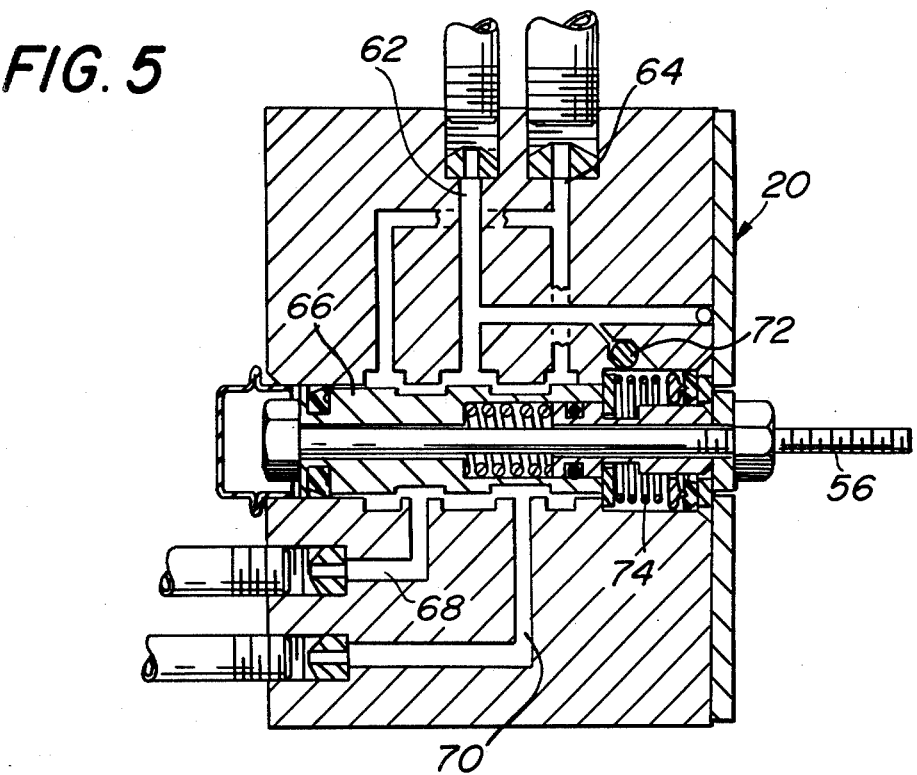

Valve rod 56 actuates hydraulic valve 20 as is clearly seen in FIG. 5. Hydraulic valve 20 is a standard hydraulic directional control valve produced by General Motors Corporation, Saginaw Steering Gear Division, Saginaw, Mich., having a part number 5691955. Hydraulic valve 20 includes pressure port 62 and return port 64 connected to a pump system well-known in the art and not important to the inventive concept as is herein described. Hydraulic valve 20 is a spool valve actuated by spool rod or member 66. Displacement of spool member 66 in longitudinal direction 14 opens and closes outlet lines 68 and 70 to provide hydraulic fluid input to power cylinder 22. Thus, movement of spool member 66 may cover outlet line 68 and return port 64 thereby providing fluid under pressure to pass through outlet line 70. In opposition, where displacement of valve rod 56 is to the right as shown in FIG. 5, outlet line 70 is closed and line 68 is open to provide opposing directional input to power cylinder 22. Modifications to hydraulic valve 20 include insertion of ball member 72 in order to block pressurized fluid from causing any assist to centering spring 74. Additionally, it has been found that original centering spring provided in hydraulic valve 20 commercially purchased from General Motors Corporation included an original centering spring 74 which had a high spring constant. Thus, a weaker centering spring 74 has been inserted to provide a four way directional control valve 20 having a light spring centering mechanism. However, the modifications and adaptations provided to the originally purchased and commercially available hydraulic valve 20 are not important to the inventive concept as is herein detailed and described, with the exception that these modifications optimize the movement of valve rod 56 and attached spool member 66 in a manner to maintain optimum displacement operability of overall power steering system 10. The important consideration being that movement of valve clamp 50 causes responsive movement of valve rod 56 which effectively directs openings of either outlet lines 68 or 70 as is shown in FIG. 5.

Hydraulic valve 20 is grounded to power steering frame member 32 which is in turn grounded to the vehicle. Thus, displacement is sensed by movement of clamp 50 which drives valve rod 56 to move spool 66 within hydraulic valve 20. Note in FIG. 1 and FIG. 3, there is shown the movement displacement of flanges 46 as well as clamp 50 and L-bracket member 52 in phantom line drawing, responsive to actuation of pinion gear 28.

The power drive system for power steering system 10 includes both hydraulic valve 20 and power cylinder 22. It is seen that elements 20 and 22 are coupled to rack housing 18 and are actuatable responsive to rack housing 18 displacement as has hereinbefore been described. Power cylinder 22 is a standard hydraulic cylinder having a part number 5691110 produced by General Motors Corporation, Saginaw Steering Division, Saginaw, Mich. In overall concept, power cylinder 22 is annular in nature and provides for an outer annularly contoured tube within which fluid under pressure passes through outlet line 70. Additionally, there is an annular inner tube through which pressurized fluid passes through line 68 to provide an opposing directional force on an internal cylinder head within power cylinder 22. Dependent upon the outlet line 68 or 70 through which pressurized fluid is forced, cylinder rod 76 is driven in either one longitudinal direction 14 or an opposing direction. Cylinder rod 76 is attached to displacement mechanism 24 through rubber bushings 78 and 80. Displacement mechanism 24 is secured to power drive systems 20 and 22 and tie rod inner ball socket on the end of rack 16 for responsive movement of tie rod 12 upon actuation of power drive mechanism 20 and 22. Power displacement mechanism 24 may be a stabilizer tube of the Gallows type to which is secured fork element 83. Stabilizer tube 24 is stabilized by constrained sliding displacement within a pair of bushings 82 and 84 which are grounded or attached to chassis section 32. Thus, tube displacement member 86 of Gallows tube 24 is reversibly displaceable in longitudinal direction 14 responsive to power drive mechanisms 20 and 22.

As is clearly seen in FIGS. 1 and 4, fork member 83 extends in transverse direction to longitudinal direction 14 and is rigidly secured to tube displacement member 86 by welding 88 or some like mechanism not important to the inventive concept, as is herein described, with the exception that longitudinal displacement member 86 results in a corresponding longitudinal movement of fork member 83.

Fork member 83 includes fork U-member 90 which includes pin member 92 which is secured to clamp 94 through welding or some like mechanism. Clamp 94 in turn, is rigidly secured to tie rod inner ball socket on end of rack 16, as is shown in FIG. 1. Thus, it is seen that displacement of tube member 86 causes a corresponding displacement of fork member 83 which acts through pin member 92 to provide longitudinal displacement forces on rack 16. Since the forces are on the center line of rack member 16, there is only a longitudinal force exerted and a minimization of any bending moments, thus, there is accomplished the elimination of any binding forces between rack member 16 and rack housing 18. It is to be understood and noted that the tie rod 12 is mounted and secured to rack member 16 in the neighborhood of fork member 83 to provide constrained motion therebetween.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described. Certain features may be used independently of others, and in certain cases, particular locations of elements may be reversed or interposed, all without departing from the spirit or the scope of the invention, as defined in the appended claims.

What is claimed is:

1. A power steering system for linearly displacing a tie rod for actuating at least one wheel of a vehicle, comprising:
    (a) a rack member extending in a longitudinal direction and coupled to said tie rod;
    (b) a rack housing being displaceable in said longitudinal direction responsive to engagement of said rack member and said rack housing;
    (c) elastic displacement means coupled to said rack housing and a frame of said vehicle for returning said rack housing to a predetermined position subsequent to said rack housing displacement;
    (d) power drive means coupled to said rack housing being actuatably responsive to said rack housing displacement; and,
    (e) displacement means coupled to said power drive means and said tie rod for responsive movement of said tie rod upon actuation of said power means.

2. The power steering system as recited in claim 1 where said rack member extends internal said rack housing, said rack member and rack housing being slidably engageable each with respect the other.

3. The power steering system as recited in claim 2 where said rack housing includes housing gear means matingly engaged to a plurality of rack member teeth for transforming rotational displacement of a steering wheel of said vehicle to a longitudinal direction force between said rack housing and said rack member.

4. The power steering system as recited in claim 3 where said housing gear means includes:
    (a) a housing pinion shaft member being operatively secured to said steering wheel, said pinion shaft member being rotationally displaceable; and,
    (b) a housing pinion gear member fixedly secured to said housing pinion shaft member, said housing pinion gear member being rotationally displaced responsive to said rotational displacement of said housing pinion shaft member.

5. The power steering system as recited in claim 3 where said engagement of said housing gear means and said rack member teeth responsively displaces said rack housing in said longitudinal direction.

6. The power steering system as recited in claim 5 where said rack housing includes:
    (a) at least one frame clamp member extending around a segment of an outer wall of said housing, said frame clamp being secured to said frame of said vehicle, said housing being longitudinally displaceable with respect to said frame clamp member; and,
    (b) at least a pair of rack housing flange members extending in a radial direction from said outer wall of said housing, said flange members being longitudinally displaced each from the other and positionally mounted on opposing longitudinal sides of said frame clamp member.

7. The power steering system as recited in claim 6 where said elastic displacement means is positionally captured between said frame clamp and said flange members.

8. The power steering system as recited in claim 7 where said elastic displacement means includes a pair of elastic isolator members mounted between said opposing longitudinal sides of said frame clamp member and said housing flange members.

9. The power steering system as recited in claim 1 where said power drive means includes:
    (a) valve means having an inlet port and a pair of outlet ports; and,
    (b) power cylinder means coupled to said valve means outlet ports for displacing a cylinder rod in a reversible longitudinal direction dependent on which of said outlet ports is in fluid communication with said power cylinder means.

10. The power steering system as recited in claim 9 where said valve means includes:
    (a) hydraulic valve means in fluid communication with a pump system of said vehicle; and,
    (b) valve actuation clamping means secured to said rack housing and said hydraulic valve means.

11. The power steering system as recited in claim 10 where said hydraulic valve means includes a spool member longitudinally displaceable responsive to said rack housing displacement for providing fluid communication between said vehicle pump and said valve ports.

12. The power steering system as recited in claim 11 where said spool member includes a spool shaft secured to said spool member and extending external said valve means, said spool shaft being displaceable in a reversible longitudinal direction responsive to said rack housing displacement.

13. The power steering system as recited in claim 12 where said valve actuation clamping means includes:

(a) a housing clamp member securely fastened to an outer wall of said rack housing being movable responsive to said rack housing displacement; and,
(b) a valve actuation bracket member secured on opposing ends thereof to said housing clamp member and said spool shaft for displacing said spool shaft responsive to said rack housing displacement.

14. The power steering system as recited in claim 9 where said power cylinder means includes a hydraulic cylinder for displacing said cylinder rod in said longitudinal direction responsive to said hydraulic cylinder being in fluid communication with one of said valve means outlet ports.

15. The power steering system as recited in claim 1 where said displacement means includes:
(a) a displaceable tube member secured to said power drive means, said tube member being movable in said longitudinal direction;
(b) a fork member extending in a transverse direction to said longitudinal direction, said fork member being fastened on opposing ends thereof to said tube member and said rack member.

16. The power steering system as recited in claim 15 where said fork member is secured to said rack member in a manner for applying substantially longitudinal force to said rack member, said tie rod being coupled to said rack member for responsive displacement of said tie rod concurrent with displacement of said rack member.

* * * * *